United States Patent [19]

Krishnakumar et al.

[11] Patent Number: 4,980,100
[45] Date of Patent: Dec. 25, 1990

[54] VENTED RECYCLABLE MULTILAYER BARRIER CONTAINER, AN APPARATUS FOR AND METHOD OF MAKING SAME

[75] Inventors: Suppayan M. Krishnakumar, Nashua; Thomas E. Nahill, Amherest; Wayne N. Collette, Merrimack, all of N.H.

[73] Assignee: Continental PET Technologies, Inc., Norwalk, Conn.

[21] Appl. No.: 454,643

[22] Filed: Dec. 21, 1989

Related U.S. Application Data

[62] Division of Ser. No. 270,840, Nov. 14, 1988.

[51] Int. Cl.$^5$ .................. B29C 49/22; B29C 49/42
[52] U.S. Cl. .................................. 264/25; 264/154; 264/156; 264/512; 264/513
[58] Field of Search ............... 264/25, 512, 513, 515, 264/154, 163, 155, 156; 425/523, 536, 812, 290

[56] References Cited

U.S. PATENT DOCUMENTS

| | | | |
|---|---|---|---|
| 2,917,197 | 12/1959 | Glover et al. | 215/12.2 |
| 2,929,525 | 3/1960 | Glover et al. | 215/12.2 |
| 3,409,710 | 11/1968 | Klygis | 264/515 |
| 3,457,337 | 7/1969 | Turner | 425/523 |
| 4,079,850 | 3/1978 | Suzuki et al. | 264/515 |

FOREIGN PATENT DOCUMENTS

| | | | |
|---|---|---|---|
| 199633 | 10/1986 | European Pat. Off. | 264/513 |
| 2153503 | 5/1973 | Fed. Rep. of Germany | 264/25 |
| 2704225 | 8/1978 | Fed. Rep. of Germany | 264/156 |
| 3327419 | 2/1985 | Fed. Rep. of Germany | 264/155 |

Primary Examiner—Jan H. Silbaugh
Assistant Examiner—Catherine Timm
Attorney, Agent, or Firm—Charles E. Brown; Paul Shapiro; Charles A. Brown

[57] ABSTRACT

Blow molded plastic containers where at least the body of such containers is of a laminated construction including, for example, a barrier layer which in the case of the container receiving carbonated products would be a gas barrier layer. It has been found that delamination does occur and this is now solved by selectively providing the container body with minute vent openings which do not extend entirely through the container body, but into that area where delamination occurs and there is an accumulation of a permeant, such as $CO_2$. The minute vents may be formed in the exterior wall of the container either by way of piercing pins or by utilizing a laser. In the case of the piercing pins, there are incorporated in the blow mold for blow molding the container from a preform and are generally placed along the parting lines of the blow mold and also in central parts of the wall. The construction and operation of the piercing pins may be provided in several forms.

5 Claims, 4 Drawing Sheets

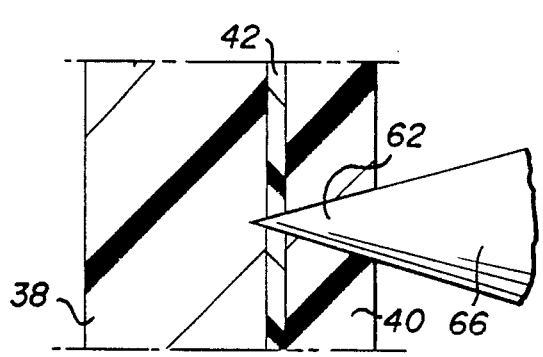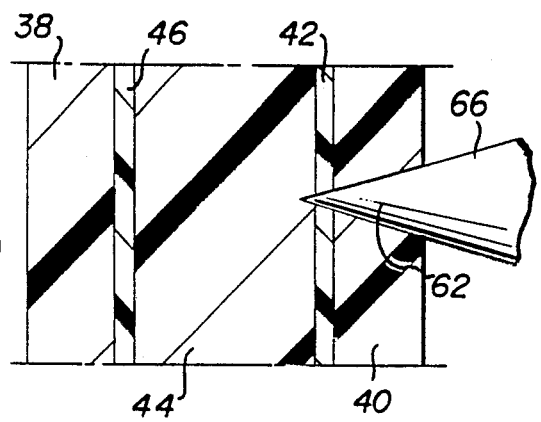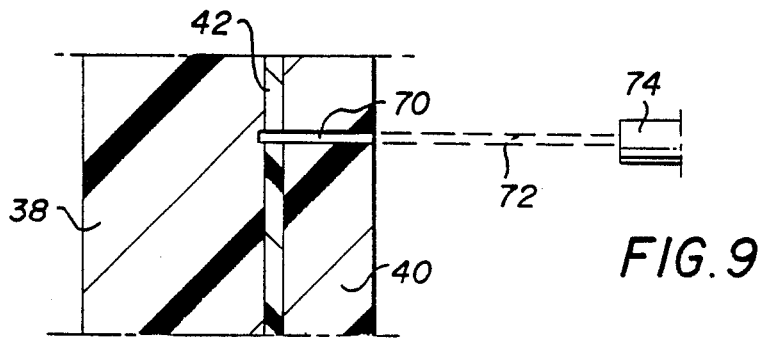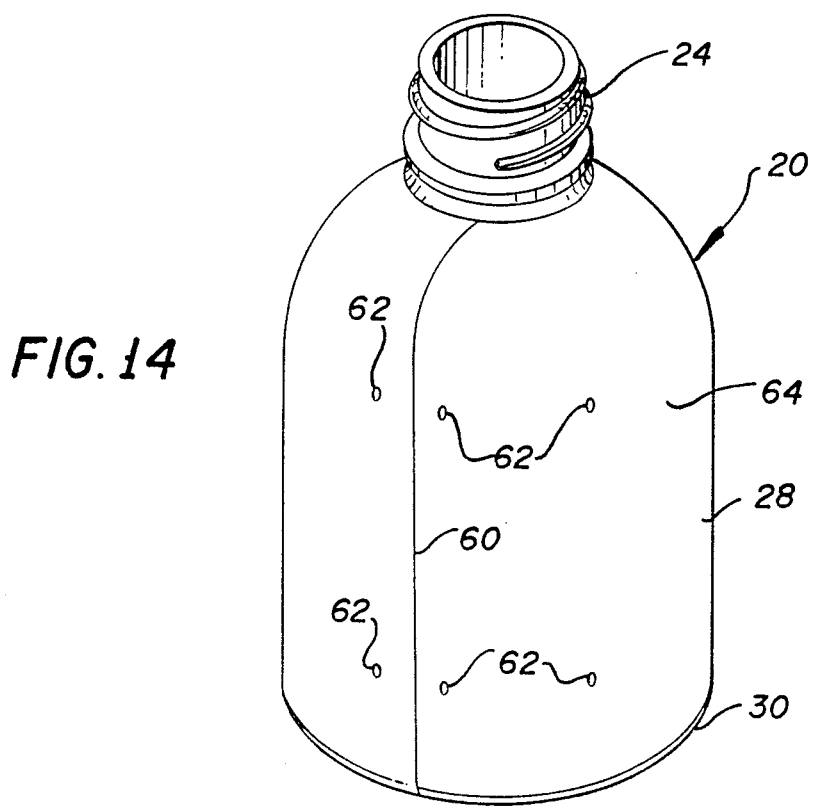

VENTED RECYCLABLE MULTILAYER BARRIER CONTAINER, AN APPARATUS FOR AND METHOD OF MAKING SAME

This is a division of application Ser. No. 07/270,840 filed Nov. 14, 1988.

This invention relates to new and useful improvement in blow molded plastic containers having laminated body walls, and more particularly to the venting of the laminations so as to prevent internal gas buildup and separation of the layers of the laminated wall.

Blow molded plastic containers having a laminated body wall construction are old and well known. This is particularly true of containers formed from polyethylene terephythalate (PET) preforms having incorporated therein at least one barrier layer. Such preforms are disclosed in prior art patents including Beck U.S. Pat. No. 4,550,043 granted Oct. 29, 1985 and Krishnakumar et al U.S. Pat. No. 4,609,516 granted Sept. 2, 1986. While the bond between the gas barrier layer and the polyester layers has proved satisfactory for many products, when certain products, particularly carbonated beverages, are packaged in such bottles, the permeant $CO_2$ tends to develop layer delamination leading to "jacketing" of the container. "Jacketing" refers to the phenomenon of the permeation of $CO_2$ across the inner primary layer and the accumulation of $CO_2$ in macro sites developed during the initial creep of the container at the interface between the inner primary layer and an adjacent barrier layer with the buildup of pressure at the interface, the creep and separation of layers leading to delamination of the entire panel section of the container. When a "jacketed" container is opened, the inner layer collapses inwardly due to the pressure of the permeant trapped at the interface and the product is forced out of the container.

More recently, in multilayer barrier containers, adhesion between the primary resin layer and the barrier resin layer is achieved by means of an adhesive layer, generally identified as the tie layer, between them. A typical five layer structure would include a primary layer, a tie layer, a gas barrier layer, a tie layer and a primary layer.

Not only is this typical five layer structure expensive to manufacture, but also the recyclability of all post-consumer plastic packages is a growing concern in the solid waste management field. The multilayer containers containing adhesive and barrier resins could lead to incompatibility and resin degradation in the melt processibility of the post-consumer grind. In such situations, it is desirable that no tie layer be incorporated in the multilayer structure. In addition to the absence of the adhesive resin, a large percentage of the barrier resin could be separated and removed from the primary resin in regrinding and separating steps. For example, the percent barrier resin content can be reduced from 4.0 to 0.2 in a non-adhesive PET/EVOH/PET system.

In accordance with this invention, the previously required adhesive layers may be eliminated and "jacketing" may be prevented by selectively venting the interface between the gas barrier layer and the next adjacent inner layer to prevent permeant accumulation at the interface and thus prevent the layer separation and "jacketing" of the container. The venting is accomplished in accordance with this invention by puncturing the outer layer and the adjacent gas barrier layer at selected locations. The selected locations are the locations which are prone to the development of macro sites due to initial creep, such as blow molding parting lines and mid-panel sections of the container.

In accordance with this invention, vent holes may be formed in the container either during blow molding or subsequent to blow molding. When the vent holes are formed during the blow molding, this is accomplished by way of pins incorporated in the blow mold. When the vent holes are formed subsequent to blow molding, the vent holes may be formed by the use of a laser.

Although the initiation of the delamination is not prevented by the venting, the subsequent growth and layer separation is prevented. The major portion of the area, more than 80 to 90 percent, remains undelaminated. The shelf life loss due to venting is only the order of 10 to 15 percent of the unvented container.

With the above and other objects in view that will hereinafter appear, the nature of the invention will be more clearly understood by reference to the following detailed description, the appended claims, and the several views illustrated in the accompanying drawings.

FIG. 7 is an enlarged fragmentary schematic sectional view showing the forming of a vent opening utilizing a piercing pin in a three layer construction.

FIG. 8 is a view similar to FIG. 7 showing the forming of a vent opening by a piercing pin in a five layer lamination.

FIG. 9 is a schematic sectional view similar to FIG. 7 showing the formation of the vent opening utilizing a laser.

FIG. 14 is a schematic perspective view of the container and shows desirable positions of the vent openings.

Figure 1:
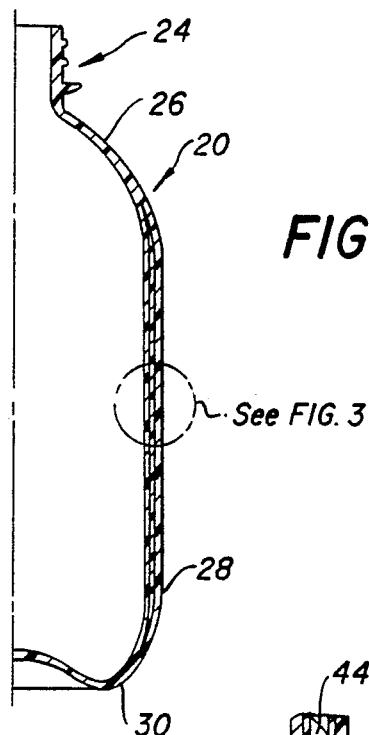
FIG. 1 is a schematic half sectional view taken through a container which is vented in accordance with this invention.
Figure 2:
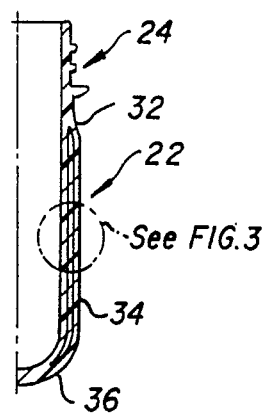
FIG. 2 is a schematic half sectional view taken through a perform a forming the container of FIG. 1.

Referring now to the drawings in detail, reference is first made to FIG. 1 wherein there is illustrated a conventional container, generally identified by the numeral 20. The container 20 is blow molded from a preform, such as a preform 22 of FIG. 2. The container 20 includes a neck finish 24, a shoulder portion 26, a generally cylindrical body 28 and a base 30. The body 28 is of a laminated wall construction as will be described in detail hereinafter.

The container 20 is formed from the preform 22 in a known manner. The preform 22 includes the neck finish 24 which remains unchanged in the container 20. The preform 22 also includes a shoulder forming portion 32, a body forming portion 34 and a generally hemispherical base 36. The body forming portion 34 will be of a laminated wall construction having the same proportions as the laminated wall construction of the body 28 of the container.

Figure 3:
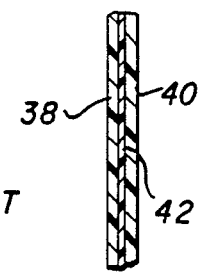
FIG. 3 is an enlarged fragmentary sectional view taken through either the body wall of the container or the body wall of the preform and shows a typical three layer construction.

Referring now to FIG. 3, there will be seen that there is illustrated a cross sectional view which is typical of the cross section of both the container body 28 and the preform body portion 34. The laminated wall construction will include an inner layer 38 and an outer layer 40 separated by a gas barrier layer 42. The layers 38 and 40 in the conventional construction are customarily formed of a polyester, preferably PET. The gas barrier layer 42 may be formed of a number of available barrier resins although at the present time EVOH is the most popular. The invention does not relate to the specific resins utilized in forming either the preform 22 or the container 20.

Figure 4:
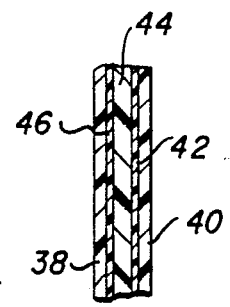
FIG. 4 is a sectional view similar to FIG. 3 and shows a typical five layer construction.

The laminated wall of both the preform 22 and the container 20 may also be of a five layer construction as shown in FIG. 4 which includes the inner layer 38 and the outer layer 40 as well as an outer barrier layer 42. However, the laminated wall of FIG. 4 includes in addition to the three layers of FIG. 3 a core 44 and an inner barrier layer 46. The core 44 may be formed of the same or different polyester from the layers 38 and 40 while the gas barrier layer 46 should be formed of the same barrier resin as the gas barrier layer 42.

Figure 6:
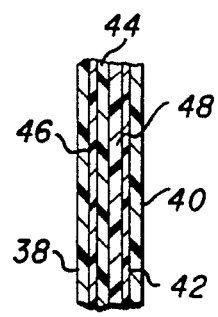
FIG. 6 is a schematic sectional view similar to FIG. 5, but shows delamination in a five layer lamination.

While in the three layer construction of FIG. 3 "jacketing" occurs between the inner layer 38 and the barrier layer 42, in the five layer construction of FIG. 4, "jacketing" occurs only at the interface between the core 44 and the outer barrier layer 42. This is due to the differential creep of the various layers. The inner layer 38 is subjected to higher normal and hoop stresses as compared to the outer layer 40. The inner layer 38 and the core 44 creep outwardly in unison, thus preventing the "jacketing" at the interface between them. Accordingly, only the outer two layers of the five layer construction need to be vented. This is shown in FIG. 6 with the permeant being identified by the numeral 48.

Figure 5:
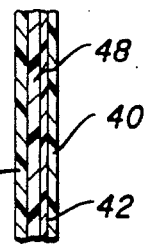
FIG. 5 is a schematic sectional view similar to FIG. 3 and shows typical "jacketing" by the passage of a gas through the inner layer.

In FIG. 5, the delamination of the barrier layer 42 and the outer layer 40 from the inner layer 38 is also shown with the permeant being identified by the numeral 48.

Figure 10:
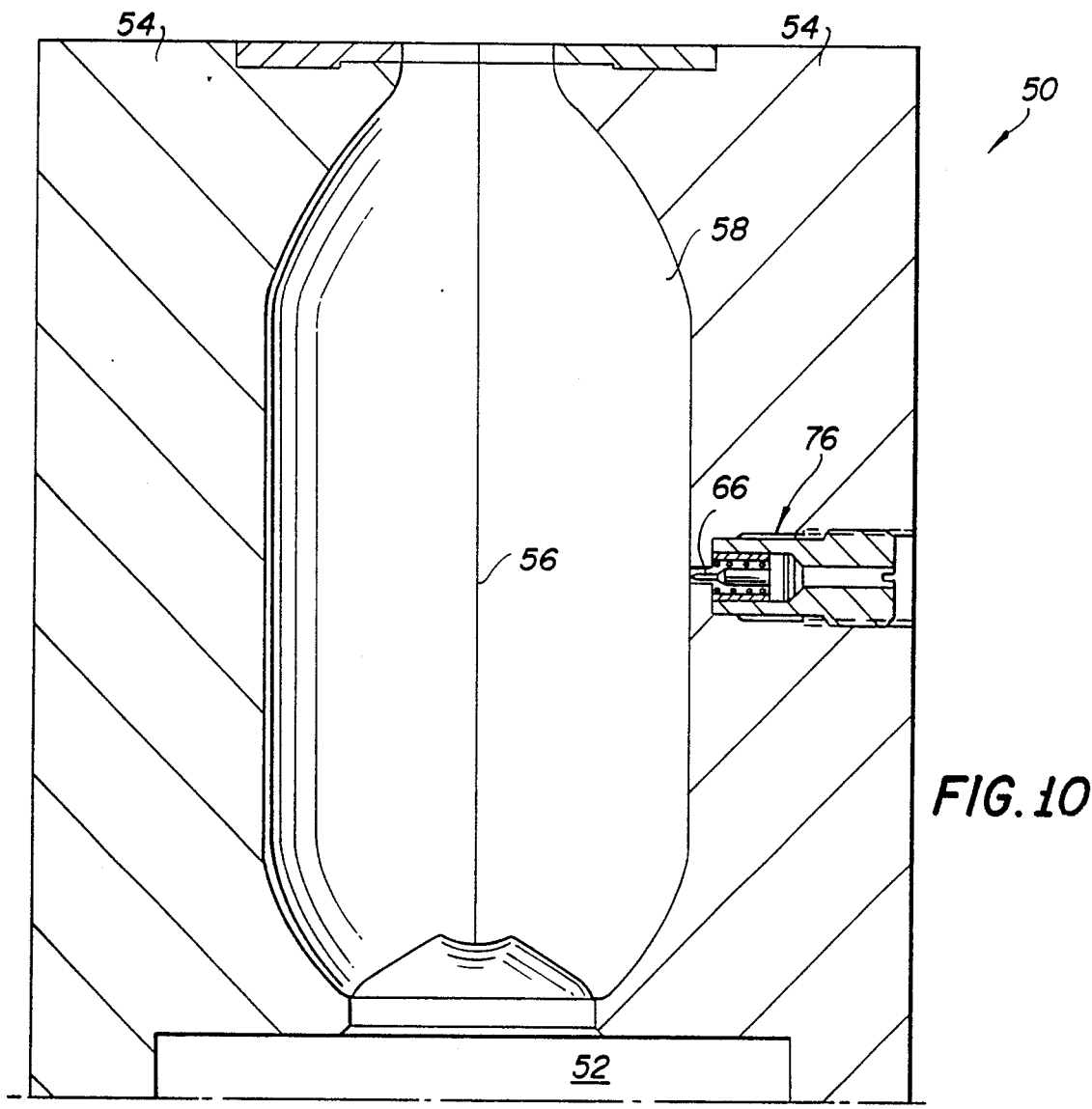
FIG. 10 is a schematic sectional view taken through a blow mold having incorporated therein a vent pin assembly.

Referring now to FIG. 10 it will be seen that there is illustrated a section through a conventional blow mold which is identified by the numeral 50. The blow mold 50 is particularly configurated to form a container with a recessed bottom, which bottom is generally identified in the industry as a champagne bottom. The mold 50 is of a three piece construction including a base member 52 and split mold halves 54, the mold halves 54 being tightly clamped together along a parting line 56. The blow mold 50 is provided with a cavity 58 of a configuration to mold the container 20 from the preform 22.

Reference is now made to FIG. 14 wherein there is illustrated a prespective view of the container 20. The container 20 is illustrated with the customary mold parting line 60 emphasized. Actually in the commercial embodiment of the container 20, the mold parting line 60 is barely visible.

In accordance with this invention, the container 14 is preferably provided with a plurality of vent holes each identified by the numeral 62. The number and positions of the vent holes 62 may vary. However, the vent holes 62 should be formed at least in the body 28 on opposite sides of the mold parting line 60 and also in what is generally considered the panel area 64 of the body 28.

The vent holes 62 are preferably formed within the blow mold 50 during the blow molding of the container with the vent holes 62 each being formed by a piercing pin 66 as illustrated in FIGS. 7 and 8. As will be seen from FIG. 7, the piercing pin 66 extends through the outer layer 40 and the barrier layer 42 and very slightly into the inner layer 38. Thus, with reference to FIG. 5, it will be seen that the permeant 48, as it passes through the layer 38 and is blocked by the barrier layer 42, will be vented to the exterior of the container through the vent hole 62. The vent hole 62 will preferably have a diameter on the order of 0.0025 inch and the taper angle of the piercing pin will be preferably on the order of 30° although the taper angle could vary without modifying the operation of the piercing pin 66.

In the three layer construction of FIG. 7, the wall thickness will be on the order of 0.01 inch and the vent opening 62 will extend from the exterior of the container body inwardly on the order of 0.004 inch.

Referring now to FIG. 8, it will be seen that there is illustrated the formation of a vent opening 62 in a five layer laminated wall. The vent opening 62 is formed utilizing the same piercing pin 66 and although the overall wall thickness will be on the order of 0.0125 inch, the penetration of the piercing pin into the exterior of the container will still be on the order 0.004 inch.

Before going into the specifics of the operation of the piercing pin 66, reference is made to FIG. 9 wherein it is illustrated that a vent opening or hole 70 may be formed in the container body wall utilizing a laser beam 72 from a laser head 74. It is to be understood that the vent hole 70 will have its cross section and depth controlled by the laser beam size and the intensity and duration of the laser beam pulse which are controllable variables.

Figure 13:
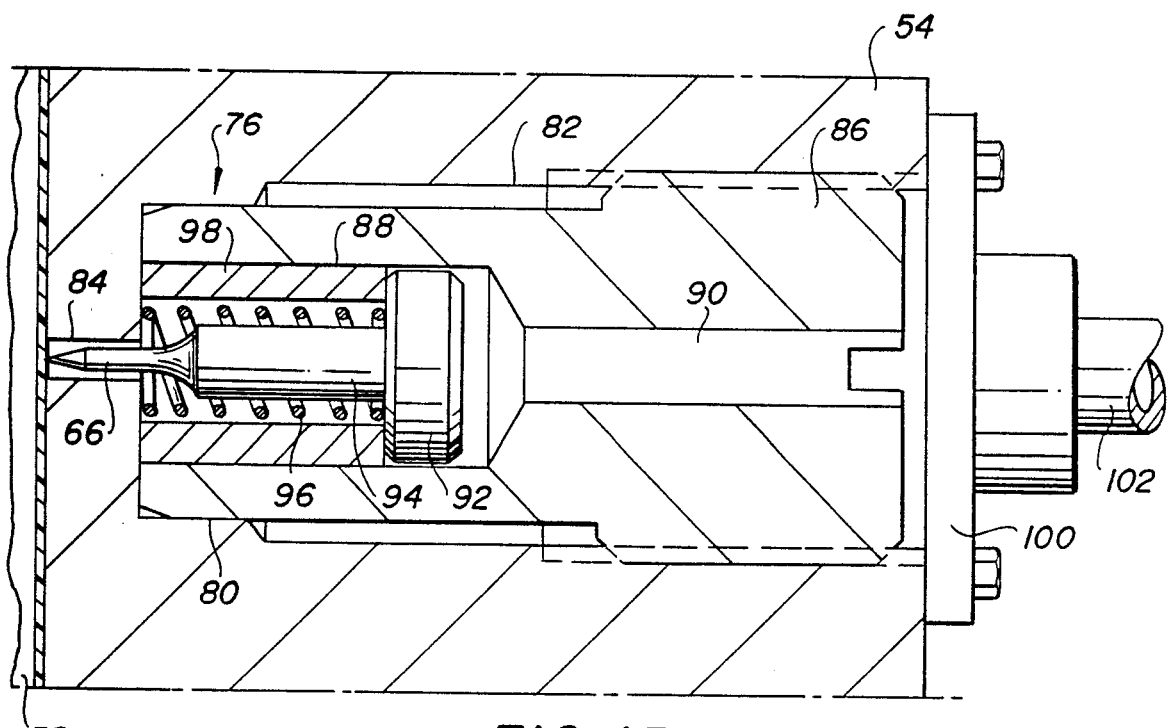
FIG. 13 is a view similar to FIG. 11 and shows the details of a fluid actuated piercing pin.

Reference is now made once again to FIG. 10 wherein it is shown that a piercing pin 66 may be mounted in one of the mold halves as part of a piercing pin unit generally identified by the numeral 76. The piercing pin unit 76 is best illustrated in FIG. 13 and includes a bore 80 in the mold half 54 which opens exteriorly of the mold half. An outer portion of the bore 80 is internally threaded as at 82. There is a continuation bore 84 which extends from the bore 80 through the interior of the mold half 54 into the cavity 58. A housing plug 86 is threaded into the bore 80 and seated on the bottom thereof although it could be adjusted.

The inner end of the housing plug 86 is provided with a cylinder defining bore 88 which has formed as an extension thereof a smaller bore 90 which functions as an air inlet. A piston 92 is slidably mounted within the bore 88 and has an extension 94 which carries the piercing pin 66, the piercing pin 66 extending into the bore 84 for projection into the cavity 58.

The piston 92 is urged to a retracted position by means of a spring 96. Movement of the piston 92 towards the cavity 58 is restricted by a depth control stop 98.

In order that air may be directed into the cylinder bore 88 through the bore 90, a suitable adapter fitting 100 is mounted on the mold half 54 in overlying relation to the opening end of the bore 80. The adapter fitting 100 will have a suitable pressure line 102 connected thereto for directing a fluid, either air or liquid, into the cylinder bore 88.

The piston 92 is illustrated in its advanced position. Normally the piston 92 is held in a retracted position remote from the depth control stop 98 by the spring 96.

In operation, the piercing pin unit 76 may be selectively energized either before the blow molding operation has been completed so that the preform material may be molded about the projecting piercing pin 66, or the blow molding operation can be completed or substantially completed, after which the piercing pin 66 is projected into the mold cavity 58 to pierce a blow molded container wall in the manner shown in FIG. 7.

It is to be understood that when the piston 92 is actuated by air pressure, the air may be supplied from the blow air source simultaneously with the introduction of blow air into the preform to effect blowing thereof.

Figure 11:
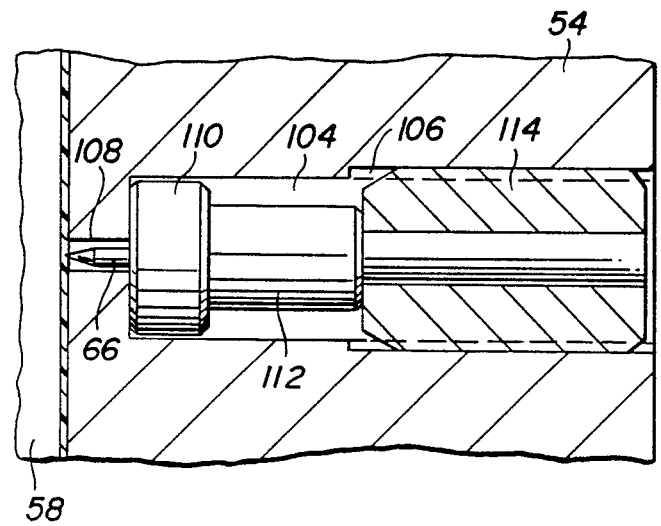
FIG. 11 is an enlarged fragmentary schematic view showing the details of a fixed piercing pin.

Reference is now made to FIG. 11 wherein the piercing pin 66 constantly projects through the mold half 54 into the mold cavity 58. The mold half 54 is provided with a bore 104 which opens through the exterior of the mold half 54 and has an internally threaded outer portion 106. The bore 104 has a small diameter continuation 108 which opens into the mold cavity 58.

The piercing pin is carried by a piston like member 110 which is guided in the bore 100. The piston 110 has an extension 112 against which a holding plug 114 bears so as to clamp the piston like member 110 against the bottom of the bore 104. The holding plug 114 is threaded into the threaded portion 106 of the bore 104 so as to permit removal and replacement of the piercing pin 66.

Figure 12:
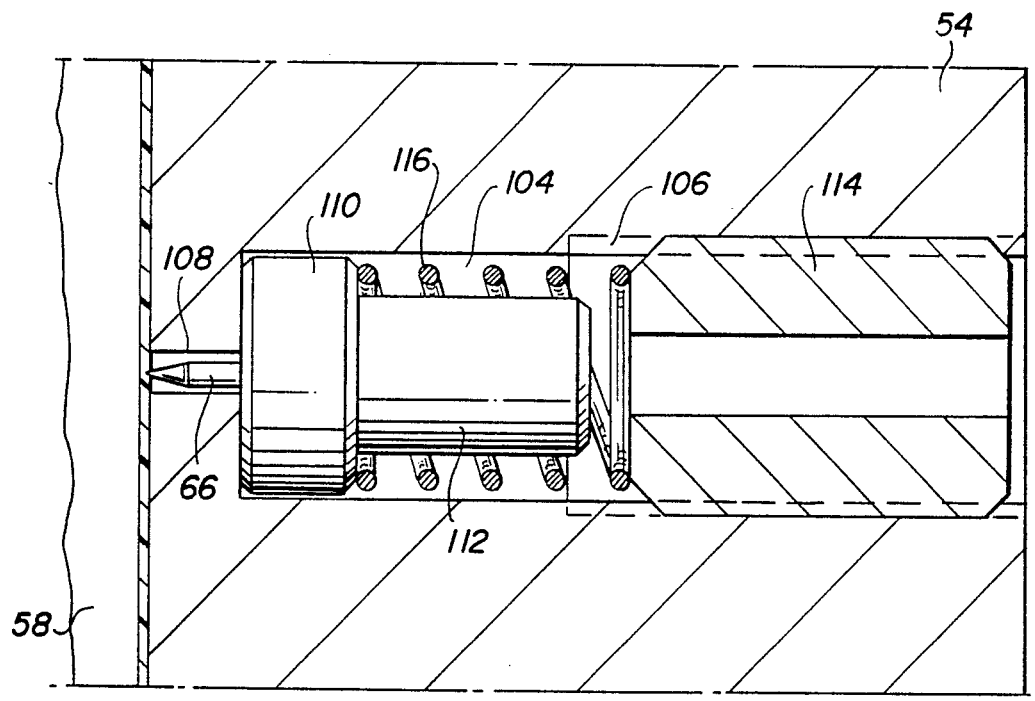
FIG. 12 is a view similar to FIG. 11 and shows the resilient mounting of a piercing pin.

A still further embodiment of the piercing pin unit is illustrated in FIG. 12. This piercing pin unit is very similar to that shown in FIG. 11 and differs therefrom only in that the holding plug 114 does not bear against the extension 112, but against a coil spring 116 which, in turn, is telescoped over the extension 112 and bears against the piston 110. This will permit retraction of the piercing pin 66 if a pressure is exerted thereon from within the mold cavity 58 should the pressure become excessive.

It is to be understood that the containers which are formed solely of PET and a barrier resin such as EVOH can be reground and utilized. If the ground components are passed through a one quarter inch screen after grinding, the reclaimed material will include 96% PET and 4% EVOH. Further, if a cyclone is utilized to separate out the fines, the reground material will become 99.2% PET and 0.8% EVOH. This percentage of EVOH can be cut in half by providing grind deionization followed by a second cyclone separation.

On the other hand, utilizing a standard PET regrinding operation followed by a wash, the reclaimed regrind will be 99.8% PET and 0.2% EVOH. In addition, if the regrind is mixed with virgin PET, depending upon the blend, the percentage of EVOH in the resultant mixture will be greatly reduced.

Although only a preferred embodiment of the invention has been specifically illustrated and described herein, it is to be understood that minor variations may be made in the location of the vent openings, the manner in which the vent openings are formed and the apparatus for forming the vent openings without departing from the spirit and scope of the invention as defined by the appended claims.

We claim:

1. A method of forming a blow molded plastic container comprising the steps of providing a preform having at least a body portion of a laminated wall construction including an outer layer, a gas barrier layer and at least one inner layer including an inner most layer, blow molding the preform in a blow mold to form said container having an exterior, and forming at least one vent opening in the exterior of the container with the vent opening extending through the outer layer and the barrier layer only and not extending through the inner most layer.

2. The method of claim 1 wherein said vent opening is formed in the exterior of the container while the container is in said blow mold.

3. The method of claim 2 wherein said vent opening is formed by a piercing pin.

4. The method of claim 1 wherein said vent opening is formed by a piercing pin.

5. The method of claim 1 wherein said vent opening is formed by a laser.

* * * * *